(12) United States Patent
Waltermann et al.

(10) Patent No.: US 7,366,887 B2
(45) Date of Patent: Apr. 29, 2008

(54) SYSTEM AND METHOD FOR LOADING PROGRAMS FROM HDD INDEPENDENT OF OPERATING SYSTEM

(75) Inventors: Rod David Waltermann, Rougemont, NC (US); Nathan J. Peterson, Raleigh, NC (US); Joseph Wayne Freeman, Raleigh, NC (US); Randall Scott Springfield, Chapel Hill, NC (US); Mark Charles Davis, Durham, NC (US); Steven Dale Goodman, Raleigh, NC (US); Isaac Karpel, Cary, NC (US); Scott Edwards Kelso, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 465 days.

(21) Appl. No.: 11/179,127

(22) Filed: Jul. 11, 2005

(65) Prior Publication Data

US 2007/0011445 A1 Jan. 11, 2007

(51) Int. Cl.
*G06F 7/00* (2006.01)
(52) U.S. Cl. .......................... 713/1; 711/100; 711/112; 711/202; 369/47.1; 360/48
(58) Field of Classification Search .................... 713/1; 711/100, 112, 202; 369/47.1; 360/48
See application file for complete search history.

(56) References Cited

U.S. PATENT DOCUMENTS

| 5,561,649 | A | 10/1996 | Lee et al. ....................... 369/47 |
| 5,596,565 | A | 1/1997 | Yonemitsu et al. ....... 369/275.3 |
| 6,449,226 | B1 * | 9/2002 | Kumagai .................... 369/47.1 |
| 6,512,722 | B2 * | 1/2003 | Kumagai .................. 369/30.05 |
| RE38,638 | E | 10/2004 | Yonemitsu et al. ........... 386/95 |
| 6,813,681 | B1 * | 11/2004 | Kanota et al. ............... 711/112 |
| 7,145,741 | B2 * | 12/2006 | Hirano et al. ................. 360/69 |
| 7,239,469 | B2 * | 7/2007 | Hirano et al. ................. 360/69 |
| 7,295,983 | B2 * | 11/2007 | Fujiwara et al. ............ 704/270 |
| 2001/0003552 | A1 | 6/2001 | Yamamoto .................... 386/46 |
| 2002/0136137 | A1 | 9/2002 | Shishido et al. ......... 369/59.25 |
| 2004/0179435 | A1 | 9/2004 | Kato ........................ 369/30.03 |
| 2005/0088933 | A1 * | 4/2005 | Kusano et al. ........... 369/47.12 |
| 2006/0195686 | A1 * | 8/2006 | Makita .......................... 713/2 |
| 2007/0274686 | A1 * | 11/2007 | Broeksteeg ................. 386/108 |

OTHER PUBLICATIONS

IBM Technical Disclosure Bulletin "Incremental Directory Indexes Once Media" pp. 1-4, -Mar. 1988.

* cited by examiner

*Primary Examiner*—Abdelmoniem Elamin
(74) *Attorney, Agent, or Firm*—John L. Rogitz

(57) ABSTRACT

A method for booting into computer memory a non-operating system (O.S.) program from a hard disk drive (HDD) prior to booting into memory an O.S. from the HDD. The method includes establishing a table of contents (TOC) on the HDD that contains entries for special O.S. programs. A pointer to the TOC is placed in non-volatile memory of the computer that is associated with the HDD, and when BIOS of the computer is prompted to load into memory one of the special O.S. programs, the pointer is accessed and used to locate the TOC, which in turn is accessed to load the special O.S. program.

12 Claims, 4 Drawing Sheets

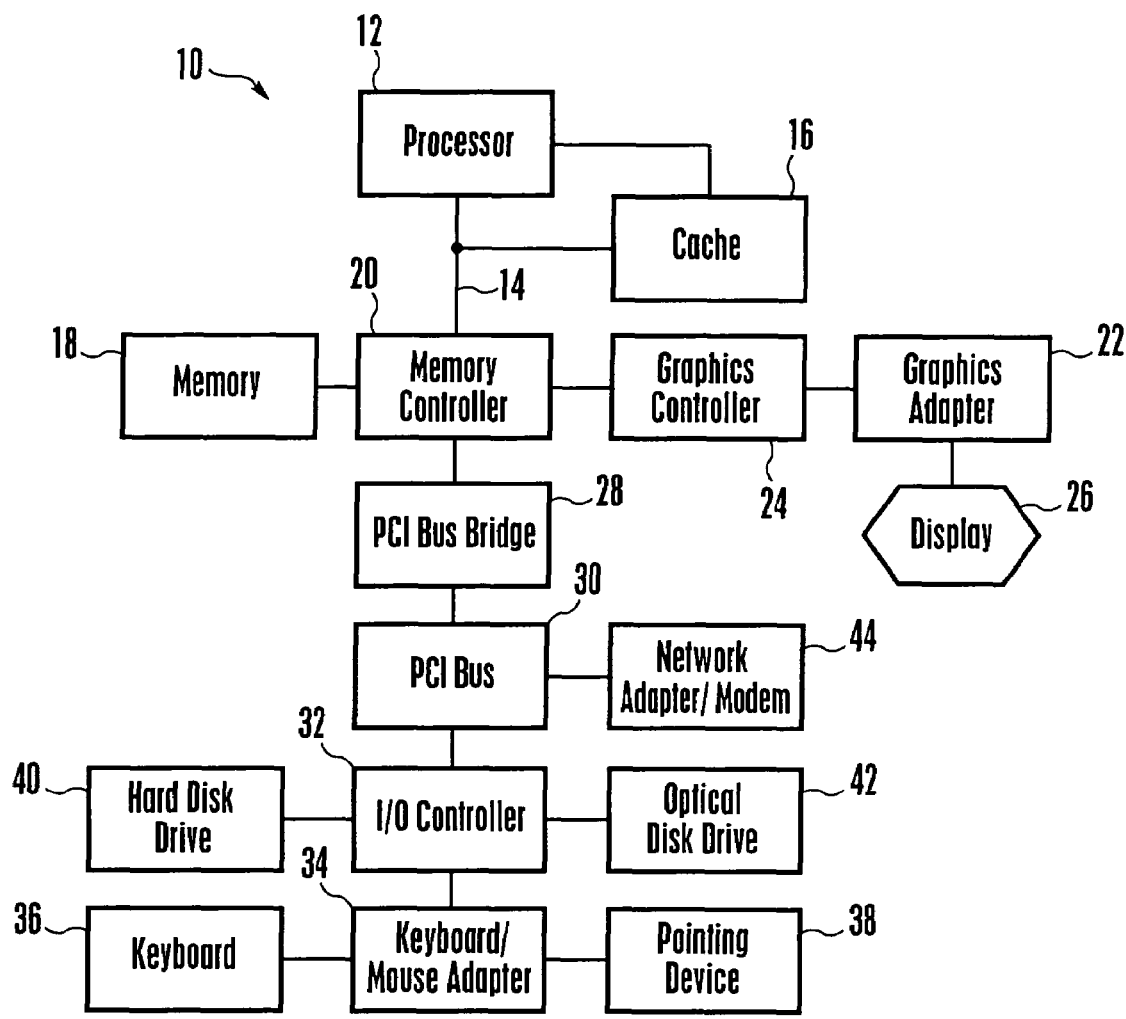
Figure 1
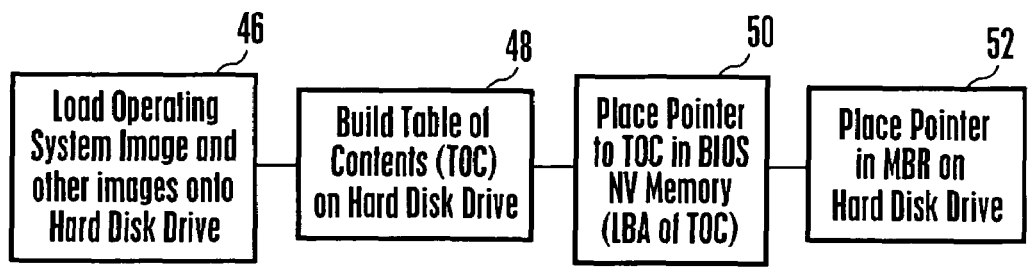
Figure 2 set-up

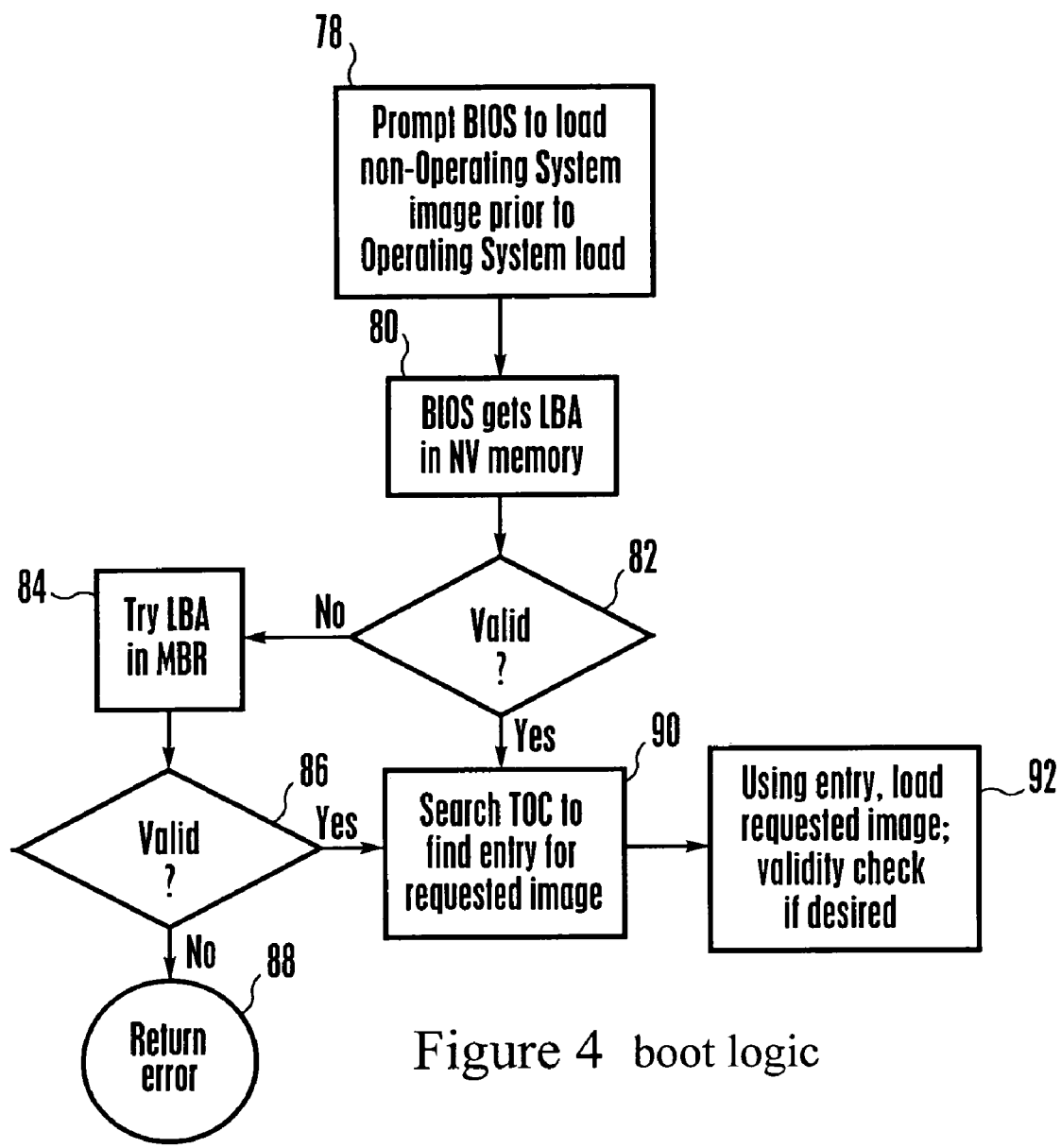
Figure 4 boot logic

SYSTEM AND METHOD FOR LOADING PROGRAMS FROM HDD INDEPENDENT OF OPERATING SYSTEM

FIELD OF THE INVENTION

The present invention relates generally to loading programs from hard disk drives (HDD) into computer memory for execution.

BACKGROUND OF THE INVENTION

When a personal computer is turned on, a basic input-output system (BIOS) that is stored in non-volatile solid state memory of the computer is invoked to begin what is known as a "boot" process, in which various initialization chores are undertaken. Among the most important of these chores is the copying of an operating system from disk storage of the computer over into typically a volatile solid state memory, such as DRAM, of the computer, for execution of the operating system by the processor of the computer when the computer is: being used. When the computer is turned off or when it is "re-booted", the operating system is flushed from the memory. By executing the operating system from the relatively fast memory instead of from the disk, computer operations are accelerated.

In accessing files on HDDs, the files typically are accessed by their logical block addresses (LBA), which are large numbers, e.g., forty eight bits, each of which is associated with a respective data block of a file. The operating system of the host computer generates the LBAs and passes them to the HDD, which determines the actual physical location on disk to store the data and which maintains an internal correlation of LBA to physical location for responding to future read and write LBA-referenced commands from the operating system of the computer.

So that the BIOS code is independent of the specific operating system of a computer, conventionally BIOS has used a single location, such as, e.g., cylinder 0, head 0, record 0, LBA 0 as the starting point from which to copy the operating system during system boot. The present invention understands that while this convention renders BIOS independent of particular operating systems, it restricts the loading of programs from disk during boot prior to loading the operating system, because the LBAs of the non-operating system programs are known only to the operating system, not to BIOS.

As recognized herein, however, it is sometimes desirable to load certain non-operating system programs, such as, e.g., security programs, system management programs, and data recovery programs, from disk to memory independent of or prior to the operating system being loaded into memory. As used herein, "special O.S. program" includes limited operating systems known variously as secure O.S., hypervisor, and service O.S. By "standard" O.S. is meant any O.S. in existence now or hereafter that is used as the standard, or "normal" operating system of the computer.

In any case, such operations may be required in the event that a user forgets a password to permit use of the standard operating system, or in the event that an emergency recovery process is required because of operating system malfunction, or for other reasons. Regardless of the particular reason for their invocation, the present invention further recognizes that these non-operating system programs cannot simply be moved onboard to non-volatile BIOS memory such as flash memory because they are too large, and consequently they must be booted from disk, with the attendant difficulty noted above regarding loading them prior to operating system boot. With these critical observations in mind, the invention herein is provided.

SUMMARY OF THE INVENTION

A method for booting into computer memory a non-operating system (O.S.) program from a hard disk drive (HDD) prior to booting into memory an O.S. from the HDD includes establishing a table of contents (TOC) on the HDD that contains entries for respective programs. The method also includes establishing a pointer (such as, e.g., an LBA) to the TOC in memory, and prompting a basic input/output system (BIOS) of the computer to load into memory the program. Using BIOS, the pointer the accessed to gain access to the TOC, which in turn is used to load the program prior to or in lieu of loading the O.S.

Non-limiting implementations of the method may further include establishing the pointer in a master boot record (MBR) of the HDD and using the pointer in the MBR if validation fails using the pointer in the memory. In non-limiting embodiments the TOC includes one or more image entries corresponding to a respective program, and each image entry may include an image identifier, a beginning LBA of the image, a size of the image, and a memory load strategy for the image. The TOC can also include a TOC table entry that has an identifier unique to the TOC. The TOC table entry may also include TOC validation information. The TOC may be used only if it passes validation.

In another aspect, a computer system includes a block storage medium such as a HDD, CDROM or other optical disk drive, or flash memory containing a table of contents (TOC). The TOC includes one or more image entries corresponding to a program on the block storage medium. A main solid state memory is included, and a processor has access to a basic input/output system (BIOS) for booting programs from the block storage medium into the main solid state memory. Also, a non-volatile solid state memory is accessible to the BIOS. The non-volatile solid state memory includes a pointer to the TOC. Logic may be executed for accessing the TOC using the pointer, and logic then accesses the program using the TOC to boot the program into the main solid state memory.

In yet another aspect, a hard disk drive (HDD) includes at least one program and a table of contents (TOC) data structure. The TOC data structure includes at least one image entry corresponding to the program. The image entry includes, among other items, an image identifier, a beginning LBA of the image, a size of the image, and a memory load strategy for the image. A TOC table entry is also provided which includes an identifier unique to the TOC and TOC validation information.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of a non-limiting computer that can use the present invention;

FIG. 2 is a flow chart of a non-limiting implementation for creating the table of contents (TOC);

FIG. 4 is a flow chart of a non-limiting implementation for using the TOC to boot special O.S. programs prior to O.S. boot.

DETAILED DESCRIPTION OF THE PREFERRED EMBODIMENT

Figure 3A:
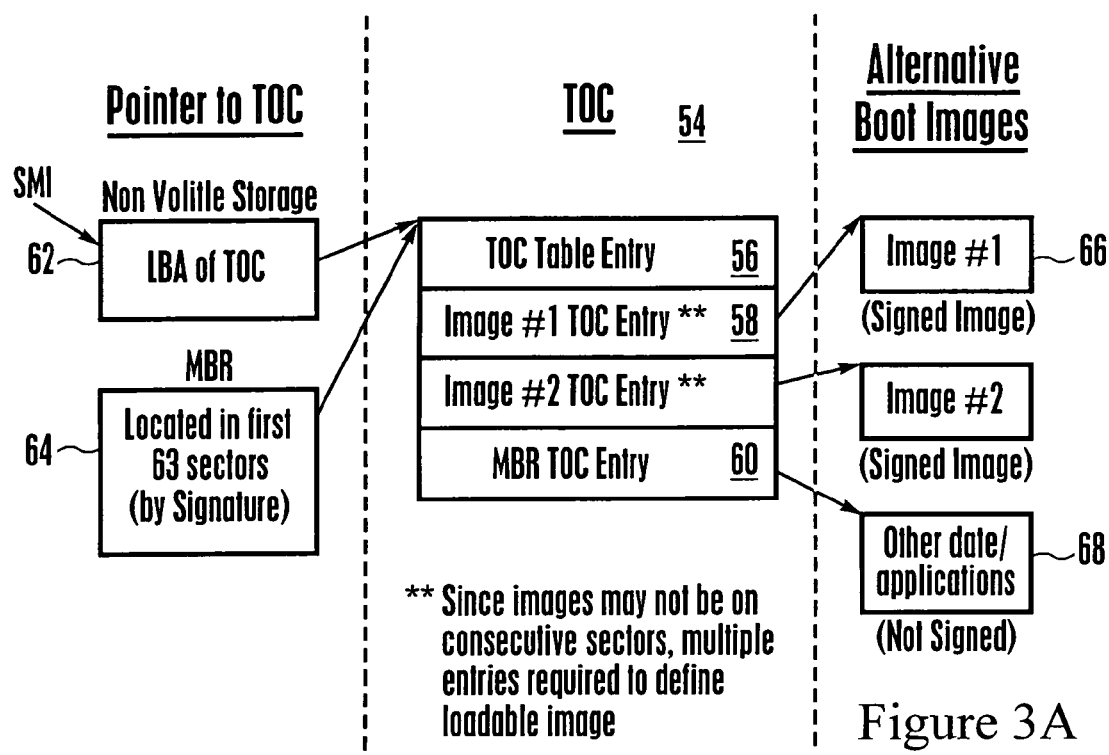
FIG. 3A is a schematic diagram of the TOC and associated data structures.

Referring initially to FIG. 1, a high-level block diagram of a data processing system, generally designated 10, is shown in which the present invention may be implemented. The system 10 in one non-limiting embodiment is a personal computer or laptop computer. The system 10 includes a processor 12, which may be, without limitation, a PowerPC processor available from International Business Machines Corporation of Armonk, N.Y. (or other processors common to the industry). The processor 12 is connected to a processor bus 14, and a cache 16, which is used to stage data to and from the processor 12 at reduced access latency, is also connected to the processor bus 14. In non-limiting embodiments the processor 12 can access data from the cache 16 or from a system solid state memory 18 by way of a memory controller function 20. The cache 16 may include volatile memory such as DRAM and the memory 18 may include non-volatile memory such as flash memory. Also, the memory controller 20 is connected to a memory-mapped graphics adapter 22 by way of a graphic bus controller 24, and the graphics adapter 22 provides a connection for a monitor 26 on which the user interface of software executed within data processing system 10 is displayed.

The non-limiting memory controller 20 may also be connected to a personal computer interface (PCI) bus bridge 28, which provides an interface to a PCI bus 30. Connected to the PCI bus 30 may be an input/output (I/O) controller 32 for controlling various I/O devices, including, e.g., a keyboard/mouse adapter 34 which provides connection to a keyboard 36 and to a pointing device 38, which may be implemented by a mouse, trackball, or the like. Additionally, a hard disk drive 40 is connected to the I/O controller 32. If desired, an optical disk drive 42, such as a DVD or CD drive, can be connected to the I/O controller 32. In some implementations a network adapter 44 can be attached to the PCI bus 30 as shown for connecting the data processing system 10 to a local area network (LAN), the Internet, or both. In any case, in accordance with principles known in the art, during power-on the processor 12 executes a basic input/output system (BIOS) program that may be stored in the memory 18, to load an operating system in the hard disk drive 40 into the memory 18.

Now referring to FIG. 2, the present set-up logic can be seen in non-limiting flow chart format, it being understood that the actual logic may be implemented in state form or other suitable form. The set-up logic to create the table of contents (TOC) described further below may be executed during manufacturing or afterward, essentially at any time that the relevant special O.S. programs have been stored on the HDD. The logic of FIG. 2 may be executed by a generator application to find all fragments of all relevant special O.S. programs on the HDD, record the physical offsets of the fragments, and store this information as set forth further below in the TOC.

Accordingly, commencing at block 46 in FIG. 2, the operating system image and the images of the special O.S. programs that might be desired to invoke prior to booting the O.S. are loaded onto the HDD 40 of FIG. 1. The below-described TOC is then created on the HDD at block 48. At block 50, a pointer to the TOC, in one embodiment the starting logical block address (LBA) of the TOC, is placed in non-volatile solid state memory such as, e.g., the flash memory mentioned above, with the memory being accessible to BIOS. Also, at block 52 a duplicate pointer to the TOC is placed in the master boot record (MBR) of the HDD 40, which also records the physical location on disk of the TOC.

Figure 3B:
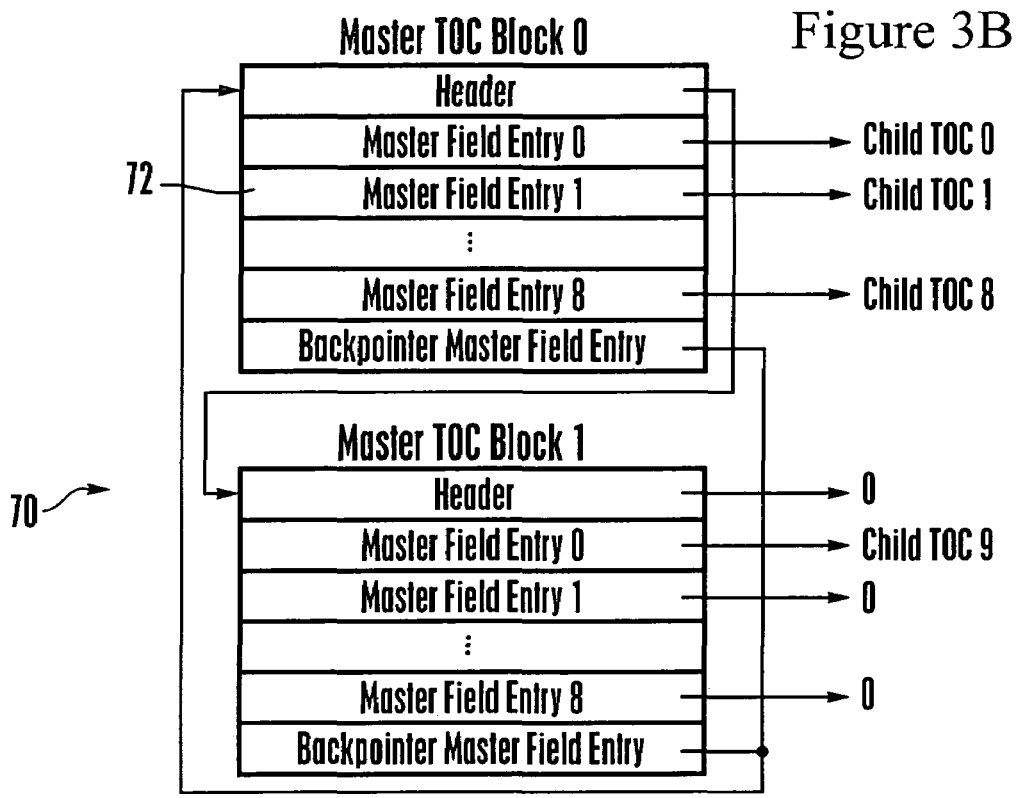
FIG. 3B schematically shows master TOC blocks.
Figure 3C:
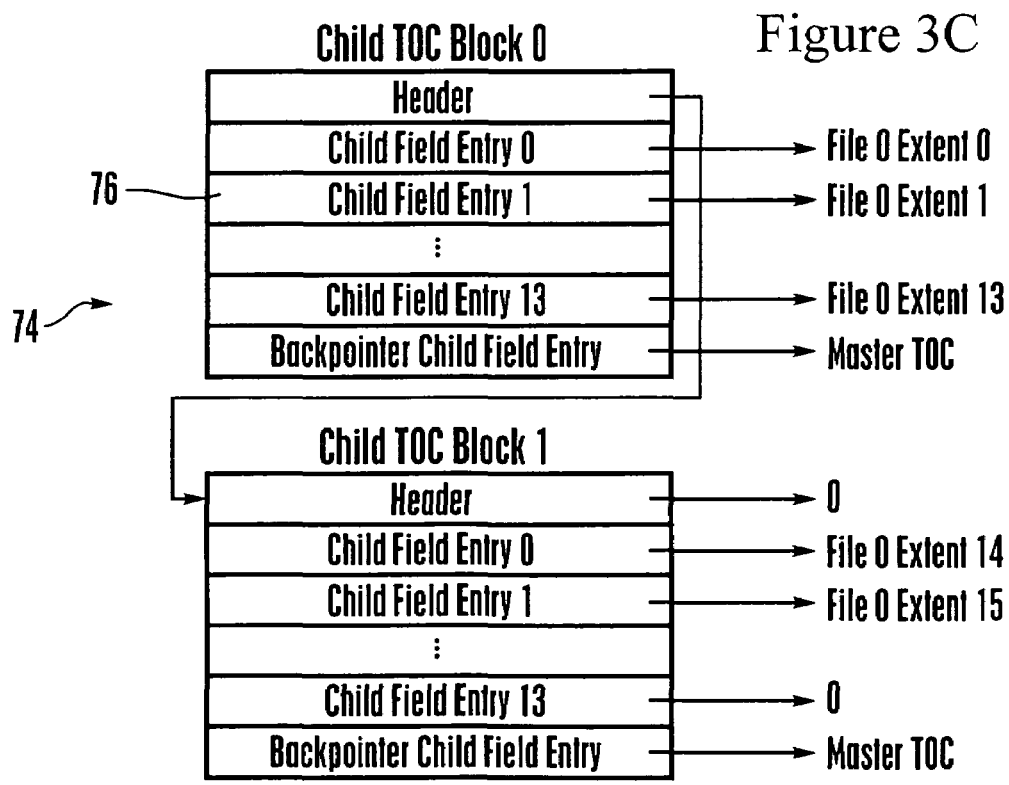
FIG. 3C schematically shows child TOC blocks.

FIGS. 3A-3C show the results of the logic of FIG. 2. A TOC 54 is established on the HDD 40. The TOC 54 includes a TOC table entry 56 that includes, at a minimum, a unique string identifying the TOC, and validation metrics (e.g., length and signature) for ensuring that the TOC is usable in accordance with principles discussed below in reference to FIG. 4.

Additionally, as shown in FIG. 3A the TOC 54 includes one or more image entries 58, each of which contains information that is necessary to boot and validate the corresponding image, it being understood that "image" here refers to a special O.S. program, including non-standard O.S. such as secure/service O.S., that it might be desirable to boot prior to standard O.S. boot. The information in each image entry 58 can include a unique image identifier, the beginning LBA of the image or portion of the image to which the particular image entry 58 pertains, the size of the image, where to load the image into memory of the computer during image boot or other image load strategy, the execution starting point, and, if desired, validation metrics to validate the image. Because fragmentation of a special O.S. program ("image") is possible, multiple image entries 58 may be required for a single program. In the non-limiting implementation shown in FIG. 3A, the TOC 54 may also include a MBR TOC entry 60 which includes the physical location of the MBR.

FIG. 3A also shows that after execution of block 50 in FIG. 2, a pointer 62 to the TOC 54 exists in non-volatile memory of the computer, e.g., the flash memory of the computer. Also, a duplicate pointer 64 exists in the MBR on the HDD 40, after the execution of block 52 in FIG. 2. As set forth further below, with this data structure, when it is desired to invoke one of the programs listed in the TOC 54, a command such as, e.g., a system management interface (SMI) call can be used to access the first LBA of the TOC and, hence, to use the LBA to access the TOC 54 itself, the various image entries 58 of which can then be used to access the desired image 66 on the HDD 40. It will be readily understood that in addition, the HDD 40 may store other data and applications 68, such as an operating system.

FIGS. 3B and 3C show that in non-limiting embodiments, the TOC structure can include a master TOC structure 70. In non-limiting implementations the master TOC structure 70 may include a timestamp indicating when it was created, and its version number. Further, in non-limiting embodiments the master TOC 70 may include one or more master TOC blocks that in turn include field entries 72 that point to sub-tables, referred to herein as "child TOCs". In one implementation the master TOC 70 contains ten field entries 72 (including a final back-pointer entry) that point to respective child TOCs, including, without limitation, child TOCs that are associated with the MBR, a lock-down region of the disk, a secure OS, a base backup, a location of a CIRT in memory, a predesktop partition, a flash update, etc.

In turn, as shown in FIG. 3C a child TOC 74 may include plural blocks with plural field entries 76. In non-limiting implementations, the child TOC blocks may be 512-byte sectors, each of which may include, as shown, a header, fourteen field entries 76 for field extents (runs of contiguous sectors), and a final back-pointer field entry pointing to the beginning of the master TOC 70, i.e., the LBA of the first block of the master TOC 70. Each field entry 76 of a child TOC 74 includes one or more pointers as shown, each of which has a name, a type, a description of the entry, and a serial number of the entry. Each pointer in a child TOC filed 76 points to data stored in a file extent on the same physical hard drive. Some main and child TOC entries can be used by various applications such as, e.g., recovery applications, and some by both the various applications and by BIOS.

Now referring to FIG. 4, the logic for using the data structure shown in FIGS. 3A-3C that is generated by the logic of FIG. 2 can be seen. Commencing at block 78, BIOS is prompted to load the desired special O.S. program prior to or in lieu of booting the standard O.S. This prompt can be undertaken using principles known in the art, e.g., by a user input during power-on self test (POST), by remote wake-up over a network, automatically when a predetermined number of boot failures has occurred, by a request planted in the O.S. itself to load another program on the next reboot, etc.

Regardless of the form of prompt to load a special O.S. program, at block 80 the BIOS accesses the pointer 62 to the TOC (e.g., the LBA of the TOC) that is in non-volatile memory. Using the pointer, BIOS accesses the TOC 54 on the HDD 40 and processes the validation metrics discussed above to determine whether the TOC is valid. As recognized herein, this validation check is desirable because a needed sector on the HDD 40 can become corrupt, or the HDD may have been derangement, in which case various entries of the TOC may be incorrect. At decision diamond 82 it is determined whether validation of the TOC is successful, and if not the pointer 64 in the MBR is accessed at block 84, the TOC is retrieved using the pointer, and validation is attempted and tested at decision diamond 86. An error is returned at state 88 if this second validation is unsuccessful.

On the other hand, upon successful validation at decision diamond 82 or 86, the logic moves to block 90. At block 90, the TOC 54 is searched to find the image entry or entries 58 that correspond to the desired program. At block 92, using the information in the TOC, BIOS accesses and loads into memory the desired program. In the case where the desired program entries contain validation metrics for the program, the program can be validated and if found to be valid, control of the computer is turned over to the program at the starting point defined in the relevant TOC image entry.

While the particular SYSTEM AND METHOD FOR LOADING PROGRAMS FROM HDD INDEPENDENT OF OPERATING SYSTEM as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A method for booting into computer memory a program from a hard disk drive (HDD) prior to booting into memory a standard operating system (O.S.) from the HDD, comprising:

establishing a table of contents (TOC) on the HDD containing entries for respective programs;

establishing at least one pointer to the TOC in memory of a computer associated with the HDD;

prompting a basic input/output system (BIOS) of the computer to load into memory at least one of the programs;

using BIOS, accessing the pointer;

using the pointer, accessing the TOC; and using the TOC, loading the at least one of the programs prior to or in lieu of loading the standard O.S.

2. The method of claim 1, wherein the pointer includes at least one logical block address (LBA).

3. The method of claim 1, comprising establishing the pointer in a master boot record (MBR) of the HDD and using the pointer in the MBR at least if validation fails using the pointer in the memory.

4. The method of claim 1, wherein the TOC includes at least one image entry corresponding to a respective special O.S. program, the image entry including an image identifier, a beginning LBA of the image, a size of the image, and a memory load strategy for the image.

5. The method of claim 1, wherein the TOC includes a TOC table entry including at least an identifier unique to the TOC and TOC validation information.

6. The method of claim 1, comprising, before the act of using the TOC, undertaking at least one validation determination on the TOC, and using the TOC only if the TOC is determined to be valid.

7. A computer system, comprising:

at least block storage medium containing at least one table of contents (TOC) including at least one image entry corresponding to a program on the block storage medium;

at least one main solid state memory;

at least one processor having access to a basic input/output system (BIOS) for booting programs from the block storage medium into the main solid state memory;

at least one non-volatile solid state memory accessible to the BIOS, the non-volatile solid state memory including a pointer to the TOC;

logic accessing the TOC using the pointer; and logic accessing the program using the TOC to boot the program into the main solid state memory.

8. The system of claim 7, wherein the logic accessing the program boots the program prior to or in lieu of booting an operating system on the block storage medium to memory.

9. The system of claim 7, wherein the pointer includes at least one logical block address (LBA).

10. The system of claim 7, wherein the block storage medium includes a master boot record (MBR) storing a pointer to the TOC, the pointer in the MBR being used at least if validation fails using the pointer in the memory.

11. The system of claim 7, wherein the TOC includes at least one image entry corresponding to a respective program, the image entry including an image identifier, a beginning LBA of the image, a size of the image, and a memory load strategy for the image.

12. The system of claim 7, wherein the TOC includes a TOC table entry including at least an identifier unique to the TOC and TOC validation information.

* * * * *